(12) United States Patent
Beere

(10) Patent No.: US 7,835,737 B2
(45) Date of Patent: Nov. 16, 2010

(54) SERVICE NETWORK

(75) Inventor: Edgar Jozef Beere, ZB Haarlem (NL)

(73) Assignee: Marchfun International N.V., Curacao (AN)

( * ) Notice: Subject to any disclaimer, the term of this patent is extended or adjusted under 35 U.S.C. 154(b) by 0 days.

(21) Appl. No.: 10/479,269

(22) PCT Filed: May 29, 2002

(86) PCT No.: PCT/NL02/00350

§ 371 (c)(1),
(2), (4) Date: May 4, 2004

(87) PCT Pub. No.: WO02/098159

PCT Pub. Date: Dec. 5, 2002

(65) Prior Publication Data

US 2004/0185846 A1    Sep. 23, 2004

(30) Foreign Application Priority Data

May 29, 2001   (NL) .................................. 1018165

(51) Int. Cl.
*H04Q 7/20* (2006.01)
(52) U.S. Cl. ...................... 455/433; 455/432; 455/426; 455/439; 455/437; 455/517
(58) Field of Classification Search ................ 455/410, 455/559, 432, 433, 558, 414, 517, 426, 437, 455/439; 370/331, 338
See application file for complete search history.

(56) References Cited

U.S. PATENT DOCUMENTS 6,018,654 A * 1/2000 Valentine et al. ......... 455/414.4
6,085,105 A * 7/2000 Becher .................... 455/517
6,714,799 B1 * 3/2004 Park et al. ................ 455/558
6,957,060 B1 * 10/2005 Sharp ..................... 455/410
7,009,952 B1 * 3/2006 Razavilar et al. ........... 370/331
7,266,393 B2 * 9/2007 Latva-Aho et al. .......... 455/561
2002/0116384 A1 * 8/2002 Laurila et al. .............. 707/10
2002/0147008 A1 * 10/2002 Kallio ..................... 455/426
2005/0075137 A1 * 4/2005 Reemtsma ................ 455/559

FOREIGN PATENT DOCUMENTS

| DE | 197 05 793 A | 9/1998 |
|---|---|---|
| GB | 2345825 A | 7/2000 |
| WO | WO 98/25426 A | 6/1998 |
| WO | WO 00/10340 A | 2/2000 |
| WO | WO 00/51383 A | 8/2000 |

* cited by examiner

*Primary Examiner*—Charles N Appiah
*Assistant Examiner*—Michael T Vu
(74) *Attorney, Agent, or Firm*—The Webb Law Firm

(57) ABSTRACT

The present invention relates to a method for transfer of (voice) data of users of a service network for the purpose of communication over mobile networks, comprising the steps of: storing data about mobile devices of users and/or data about users in one or more first data files of the service network; transfer coordinated by the service network and/or by the service network itself of (voice) data which users wish to have transferred and/or data used to route and/or store the data; using one or more mobile networks to provide mobile network facilities for connecting the mobile devices of the users to the first service network, wherein the mobile devices, when they sign on to a mobile network, are signed on to each of the telephony networks as local devices for the network in question.

27 Claims, 4 Drawing Sheets

SERVICE NETWORK

BACKGROUND OF THE INVENTION

Users of mobile communication make use of the services of a mobile telephone network such as a GSM network. In addition to the use of the services of the network in question, these GSM networks also offer users the option of making use of services of other networks. In this case use data and telephony data are transferred from the one mobile network to the other mobile network. This however requires that all telephony networks making mutual use of each other's services must make provisions for this purpose. This is time-consuming and costly for the users of the networks.

Known from the international patent application WO 00/51383 is a super-network for connecting a number of telephone networks. Users of an identification module of a first network can herein make use of telephones connected to a second network. A drawback hereof is that the user is always faced with having to switch between the different networks.

SUMMARY OF THE INVENTION

In order to obviate such drawbacks the present invention provides a method for transfer of (voice) data of users of a service network for the purpose of communication over mobile networks, comprising the steps of:
  storing data about mobile devices of users and/or data about users in one or more first data files of the service network;
  transfer coordinated by the service network and/or by the service network itself of (voice) data which users wish to have transferred and/or data used to route and/or store the data;
  using one or more mobile networks to provide mobile network facilities for connecting the mobile devices of the users to the first service network, wherein the mobile devices, when they sign on to a mobile network, are signed on to each of the telephony networks as local devices for the network in question.

An advantage of this method is that subscribers to the service network gain access to the service network via a mobile network wherein it is not important in which coverage area a subscriber is situated. Direct use is not made of one specific network but of the service network. It is hereby no longer necessary to depend on mutual network connections between separate mobile telephony providers. A further advantage of this invention is that various types of data networks can be used to obtain connection to the service network. Depending on the service, which can be speech, data, broadband data, streaming video, a suitable type of connecting network to the service network is chosen. It is possible herein to envisage a telephony-based network such as GSM or UMTS, a wireless ethernet (such as 802.11 a or b) or a successor to such technologies.

In the case that the networks are for instance GSM telephony networks, a further advantage is that users always have an indication of the service network in the display of a mobile phone and therefore have no association with the mobile network being used at any one moment for the physical access to the service network.

A preferred embodiment of the present invention further provides a method as specified above, further comprising the steps of:
  using one or more data files of local users (HLR) of a mobile network for signing a mobile device of a user on to the mobile network, wherein identification data relating to mobile devices of network users and/or relating to network users is stored in data files of local users of each mobile network of which the user can make use. This embodiment preferably comprises the further steps of:
  using one or more first databanks to sign the mobile device of the user on to the service network.

By providing data files in the mobile networks for signing mobile devices of users on to mobile networks with the identification data of the mobile devices of network users and/or for network users, it becomes very simple to sign users on to a mobile network as local users. The advantage of signing users on to a mobile network as local users is that it is not necessary to use a data file for visiting users (VLR). The use of such a file would result in the mobile network wanting to forward data concerning such use to an mobile network at equivalent level in the usual manner. It is however the intention that data relating to use of the network by a subscriber to the service network be forwarded to the service network. By embodying this in the form of data files forming part of the local user file of a mobile network, the user becomes a local user and no contact is therefore sought with other mobile networks.

A further preferred embodiment according to the present invention provides a method further comprising one or more steps for using one or more identification modules (SIM) for signing a mobile device on to a mobile network, using identification means present on an identification module. Identifications are herein proposed such as a User ID, telephone number, IMSI, IP number and other identifications usual in networks. These can be stored in a memory of a mobile station such as a handset or in a memory of an identification module such as a SIM.

Such a method has the advantage that use can be made of networks connected to the service network without the service network itself being provided with means according to a method as described above. Here can be envisaged PLMNs such as GSM networks, mobile Ethernet networks and other, preferably wireless last-mile or end user connecting provisions.

The identification means for each mobile network are preferably provided with one or more identification means with identification codes and an algorithm for selecting the correct one thereof, which is recognized by a mobile network as a local identification code. In order to sign a mobile device on to a network, the network and the device must have the same identification code. Such a code is unique for all mobile networks and a device must therefore have a separate unique code for each network. In order to be able to sign on to a network, the device must sign on with the correct code for that network. It is an object of this embodiment to select the correct code with the identification module on the basis of data relating to the network and the device, whereafter the device can sign on using this identification code.

In a further embodiment of the method the identification means comprise an algorithm for generating an identification code which is recognized by a mobile network as a local identification code. Just as in the foregoing embodiment, it is necessary to sign on to the correct network using the correct identification code. It is an object of this embodiment to generate the correct code with the identification module on the basis of data relating to the network and the device, whereafter the device can sign on using this identification code.

A further embodiment provides a method wherein a separate identification module is arranged in the mobile device for each mobile network, wherein the user of the device selects which module can be used as local identification module for an available mobile network. In this embodiment it is also necessary for the correct identification code to be used for signing on to a network. For this purpose a SIM card for each mobile network to be used can be made available to the subscriber for access to that network.

A further embodiment provides a method as specified above, further comprising the steps of:

using one or more first databanks for signing the mobile device of the user on to the service network. Using data from such data files a mobile network can obtain information about sign-on rights of mobile devices. In this embodiment such data files are embodied centrally in the service network.

In the method the data file of local users of the mobile networks is preferably placed distributed per mobile switching centre (MSC) so as to reduce network traffic in respect of this data. If many subscribers to the service network make use of (a part of) a mobile network, it can be advantageous to place (parts of) the files in distributed manner in order to reduce the network traffic that is necessary.

In the method such distributed data files are preferably incorporated in a mobile network as Signalling Points (SPs) with their own address in accordance with a communication protocol. Existing infrastructures can hereby be utilized, which makes implementation of such distributed files advantageous and simple. If the SPs are further provided with for instance IP addressing functionality, direct Internet connections can be realized via the SPs, which has the advantage that existing infrastructures are better utilized.

In a further preferred embodiment according to the present invention mobile switching centres (MSCs) are connected to the service network by means of one or more networks. This makes it possible to transfer data from said files from the service network to the mobile networks, and vice versa.

A particular preferred embodiment of the present invention provides a system for transferring (voice) data of users of a service network, comprising:

the service network comprising one or more databanks for storing data about mobile devices of users and/or about users, and means for coordinating and/or transferring (voice) data which users want to have transferred and/or data used to route and/or store the data, and one or more mobile networks for connecting the mobile devices of the subscribers to the service network, wherein the mobile devices, when they sign on to a mobile network, are signed on to each of the mobile networks as local devices for the mobile network in question. The advantages of such a system are the same as those of the above described method.

BRIEF DESCRIPTION OF THE DRAWINGS

Further advantages, features and details of the present invention will be elucidated with reference to the annexed figures, wherein.

DETAILED DESCRIPTION OF THE INVENTION

A preferred embodiment of the present invention (FIG. 1) is a data and/or telephony network 10 comprising a plurality of sub-networks as well as a number of data files 11 and a number of processing units 12.

Figure 1:
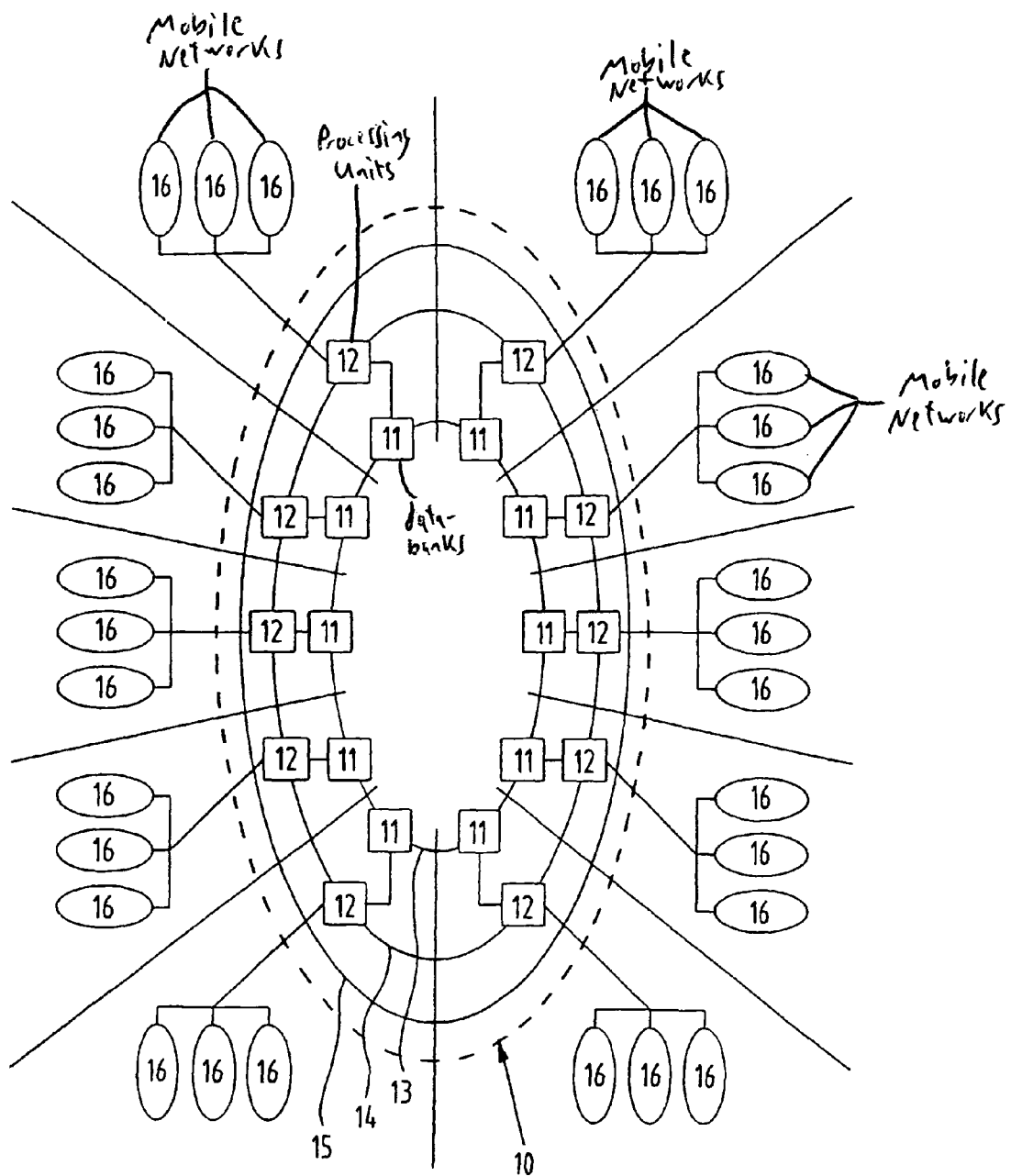
FIG. 1 is a diagram of a topology of an embodiment according to the present invention.

A number of telephony networks, preferably mobile telephony networks such as GSM, UMTS and/or IMT networks, are connected to the data and/or telephony network. The embodiment of FIG. 1 is an intercontinental network wherein the mobile telephony networks 16 may be individual mobile telephony networks and/or data networks in different countries, wherein it is also possible for different networks to be operational in one country. For the purpose of the intended geographical range there are provided a plurality of redundant databanks 11 and processing units 12. Another reason for giving these databanks and processing units a redundant form is that a large processing capacity is required, whereby a plurality of units is necessary to provide this processing capacity.

The network further consists of connections 13 and 14 for transferring data within the network. There are connections 15 for transferring (voice) data for the subscribers. The mobile networks 16 are also connected to connections 15. The data flow can be regulated at the connecting points of network connections 15 and networks 16, for instance by means of load balancing. An advantage hereof is that the efficiency of the network is improved in that information frequently used locally is stored distributed in optionally redundant manner, whereby data traffic is reduced, or in that little used data is stored centrally, which for instance limits the system maintenance.

According to an embodiment the users of network 10 are provided with physical access to the network via mobile telephony networks 16. According to the present invention they are herein subscribers to network 10 and they are recognized by network 16 as local users or subscribers. According to the prior art users are subscribers to one mobile telephony network. By means of roaming they can herein also make use of mobile telephony networks other than their own. The networks are herein at the same hierarchical level, wherein the networks grant access to each other's users. For this purpose the networks have two location data files, the home user location data files and the visitor location data files (HLR, VLR). These files keep track of for instance in which cell of a network a user is situated. The mobile networks herein mutually exchange visit and use data of the visitor users who have made use of each other's networks.

According to the present invention the subscribers of the first data and/or telephony network 10 are connected as local users to mobile telephony network 16. Use data relating to the subscribers is herein transferred to the central data files 11. A subscriber is therefore not a home user of only one mobile network 16 but is recognized by all associated mobile telephony networks 16 as being a home user, wherein the data of these home users is transferred to the first data and/or telephony network 10. It hereby becomes possible to establish both national and international connections by means of the service network, wherein roaming according to the prior art is therefore no longer necessary.

This process can be technically implemented in various ways. Different embodiments are provided for this purpose. One possibility of realizing this method is by arranging data files, software and processing capacity in the mobile networks. Another method of registering users in different mobile telephony networks 16 as local users is to modify the identification modules (SIM cards) such that this becomes possible. This can take place in three ways. The first way is to provide the SIM card with an algorithm which, depending on the subscriber and an available network to which the subscriber wishes to sign on at any time, generates an identification code (a code designating him or her as a local for the relevant network), whereby the relevant network can identify and thus recognize this user as a local user. A second way is to provide a SIM card with one identification module (for instance Virtual Machine in accordance with the SMART card for Windows standard or Card Applications in accordance with the open standard architecture) per network, which can serve for this subscriber as access network for the first data and/or telephony network. In this case an algorithm must be further provided for selecting the correct identification for an available network. A third way of providing a subscriber with a suitable SIM card for each network to which he can sign on is to provide a separate, physical SIM card per network from which he must then select the suitable SIM card.

Figure 2:
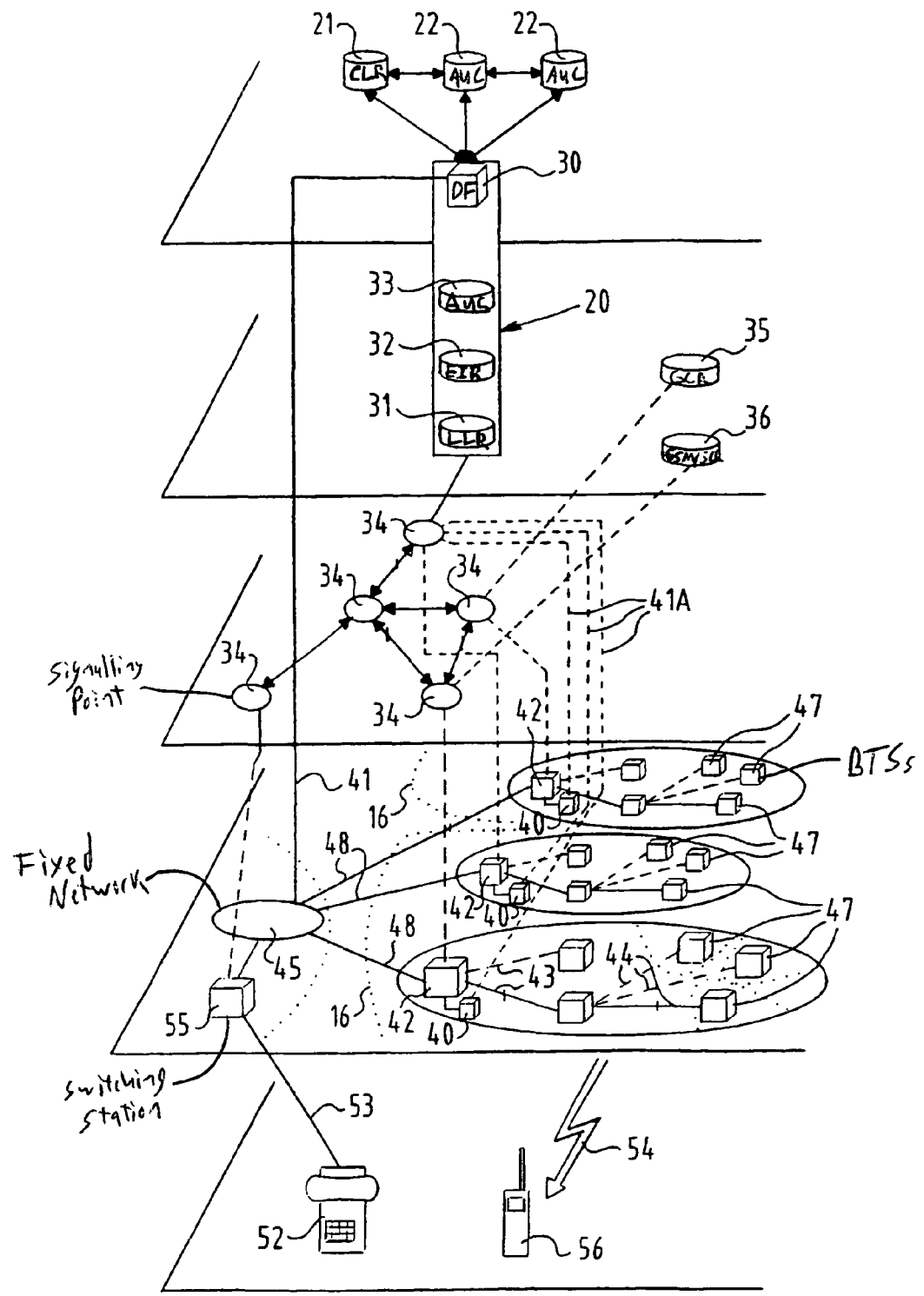
FIG. 2 is a diagram of an aspect of a preferred embodiment according to the present invention.

FIG. 2 shows the situation in which the mobile networks 16 are provided with data files, software and processing capacity for the purpose of registering as local user the subscribers to the first data and/or telephony network (coordinating network). Data file 30 of the coordinating network herein comprises two data files as already usual in the prior art in GSM networks, the AUC 22 (Authentication Centre) and EIR 23 (Equipment Identity Register), in addition to a CLR 21 (Central Location Register), which provides a function at central network level of the coordinating network similar to an HLR (Home Location Register) of a GSM network according to the prior art. At central level of the coordinating network this data file 30, among other things, keeps track of where the subscriber is located in similar manner as formerly in a GSM network.

At the level of mobile network 16 four conceptual layers are distinguished in the usual manner. These are firstly the database level, secondly the Signalling level, thirdly the network level and fourthly the user level. At database level a distributed part 20 of data file 30, which contains EIR 32, AUC 33 and LLR 3 (Local Location Register) and a local part of CLR 21, replaces the usual data from the HLR, EIR and AUC of a mobile network. At the Signalling level of the mobile network this data file 20 receives its own node 34 in the communication protocol (for instance SS7 or IP) of the mobile network. The data file level of a mobile network 16 further provides the usual nodes GCR 35 and GSM/SCR 36, which are used for monitoring the quality of the network (see for instance the ETSI GSM standards).

At the Signalling level of a mobile network use is made of Signalling Points which are nodes in underlying network protocols such as SS7 or for instance IE. These Signalling Points 34 each have their own address in the protocol. Signalling Points 34 correspond with network nodes in the physical switched network.

Two mobile networks 16 are shown at the network level in FIG. 2. A mobile network 16 consists of one or more MSCs 42 (Mobile Switching Centre). An MSC is a component of a mobile network which is connected to a fixed network 45 via connections 48. This fixed network (Switched Network) connects fixed telephony to mobile telephony, as well as the mobile telephony networks to the coordinating network via connection 41 for transferring data between the mobile networks and the coordinating network. An MSC switches diverse BTSs 47 (Base Transceiver Station). This latter is a standard method of building up a mobile network. According to the present invention diverse MSCs can make use of one data file 20. It is however also possible to place redundant copies of data file 20 in distributed data files 40 by means of extra Signalling Points 34. This has the particular advantage that, if a mobile station 51 of a subscriber to the coordinating network wishes to make use of a mobile network, data can be retrieved locally in a mobile network from the distributed data files 40, and do not have to be retrieved each time from the central data file 20. Network administrators will opt for such a distributed data storage if the central storage requires too much data transport and thereby becomes too slow.

At the user level of a mobile network there are mobile subscribers with a mobile device 51. It is however also possible for subscribers to sign on using a telephone apparatus 52 which is connected via network 53 to a fixed switching station 55 (telephone exchange) of a fixed network 45. It is further possible that users make use of computers which are mainly suitable for data traffic instead of making use of telephones which are mainly suitable for voice traffic. Making use of a method according to the present invention it is further possible that users use equipment which does not make use of switched telephony networks, but which makes use of data networks such as for instance the Internet. In these cases it is sufficient that they are recognized and identified as subscribers by the coordinating network on the basis of a data file. In these cases network user data can also be transferred to the coordinating network. In this case the service network, or coordinating network, will link identifications specific to an underlying network which is applied to enable connection to the user. It is possible here to envisage storage and linking of IMSI, telephone number, apparatus identification numbers, network card identification number, IP addresses and so on. This is also important for passing on costs to the users. The coordinating network can hereby function as a clearing house for connection costs made via whichever type of connecting network is used.

Examples of connecting networks which can be used are the already mentioned GSM networks, as well as Ethernet access points or other wireless network connections with which for instance a connection to Internet can be made at a speed many times higher than in the case of for instance a GSM, UMTS or similar network.

In the case the subscriber makes use of mobile telecommunication equipment in for instance GSM or UMTS networks, he will make use of a SIM card for signing on to a mobile network as a user. As already stated above, there are three options for making possible the method according to the present invention using such SIM cards.

Figure 3:
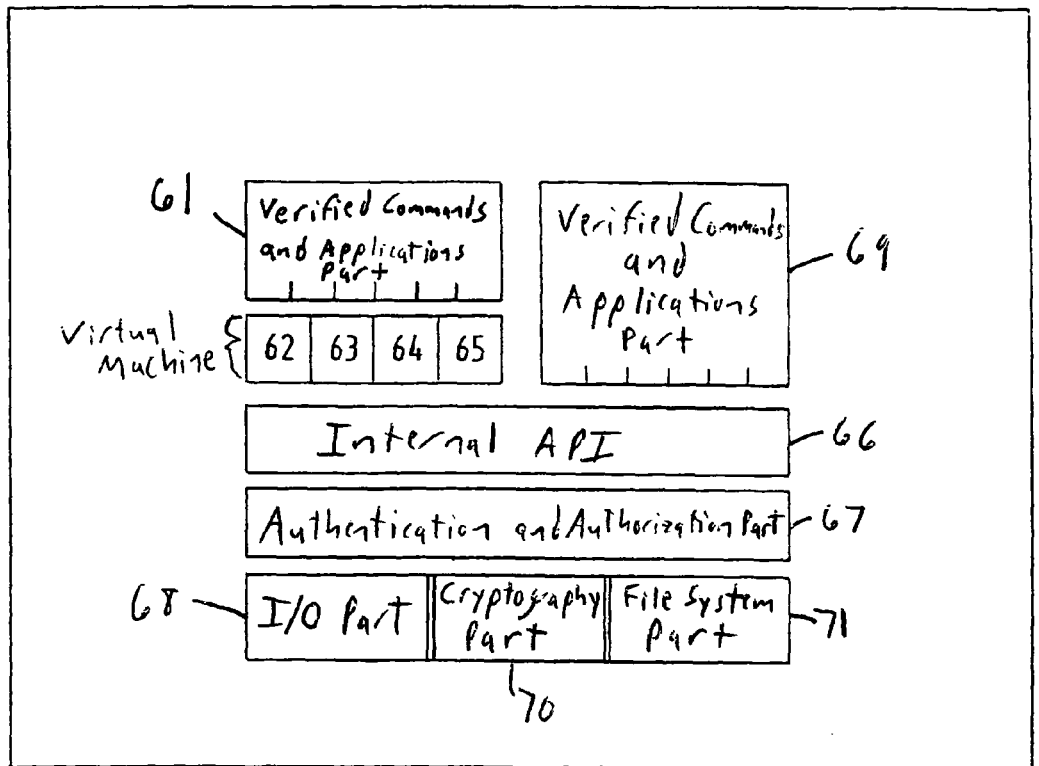
FIG. 3 is a diagram of an embodiment according to the present invention.
Figure 4:
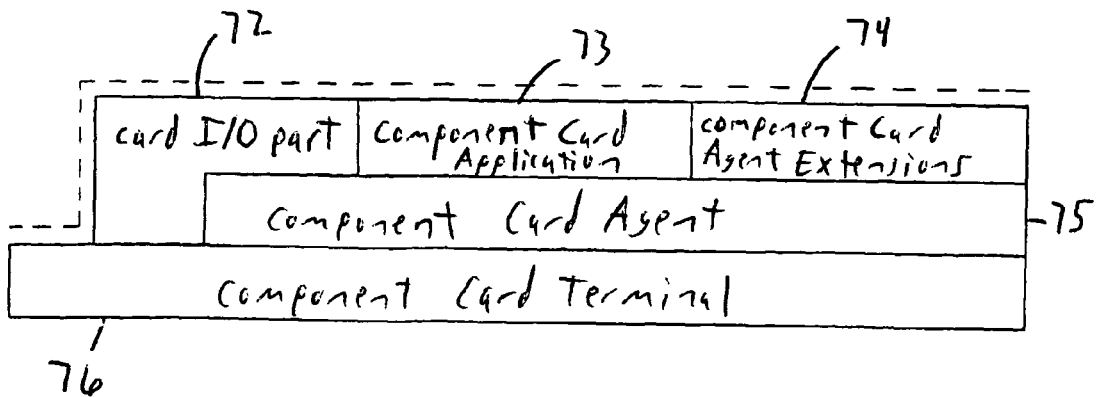
FIG. 4 shows another embodiment of the configuration of FIG. 3.

FIG. 3 shows a SIM card in accordance with the standard SMART card for Windows. This comprises different components such as a Verified Commands and Applications part 61, Virtual Machine 62, 63, 64, 65, Internal API 66, Authentication and Authorisation part 67, I/O part 68, cryptography part 70, File System part 71 and Verified Commands and Applications part 69. Firstly, it is possible to provide a SIM card (FIG. 3) with for instance four Virtual Machines 62, 63, 64, 65 in the case that the subscriber according to the present invention can make use of four mobile networks. Each of these Virtual Machines 62, 63, 64, 65 contains the data also contained by a single Virtual Machine in a usual prior art SIM card. Another standard for a SIM card is for instance the "open standard architecture" (FIG. 4). This comprises a card I/O part 72, a component Card Application 73, a component Card Agent Extensions 74, a component Card Agent 75 and a component Card Terminal 76.

Prior to use a mobile telephone must be signed on to a mobile network. For this purpose a mobile network possesses an identification code (IMSI) for each telephone known as local subscriber. If a mobile telephone signs on using such a code, it is signed on as a local telephone with this code. In the case that use is made of a card in accordance with the "SMART card for Windows" standard, the Virtual Machine comprises this identification code. If, according to an embodiment of the present invention, the SIM card is provided with diverse Virtual Machines, the correct Virtual Machine with the correct code must be selected when signing on to a mobile network. In order to make this possible on a network which is not modified as according to the present invention, the SIM card must be able to select a correct identification code so that the telephone can be used in the network as a subscriber to the coordinating network.

Figure 5:
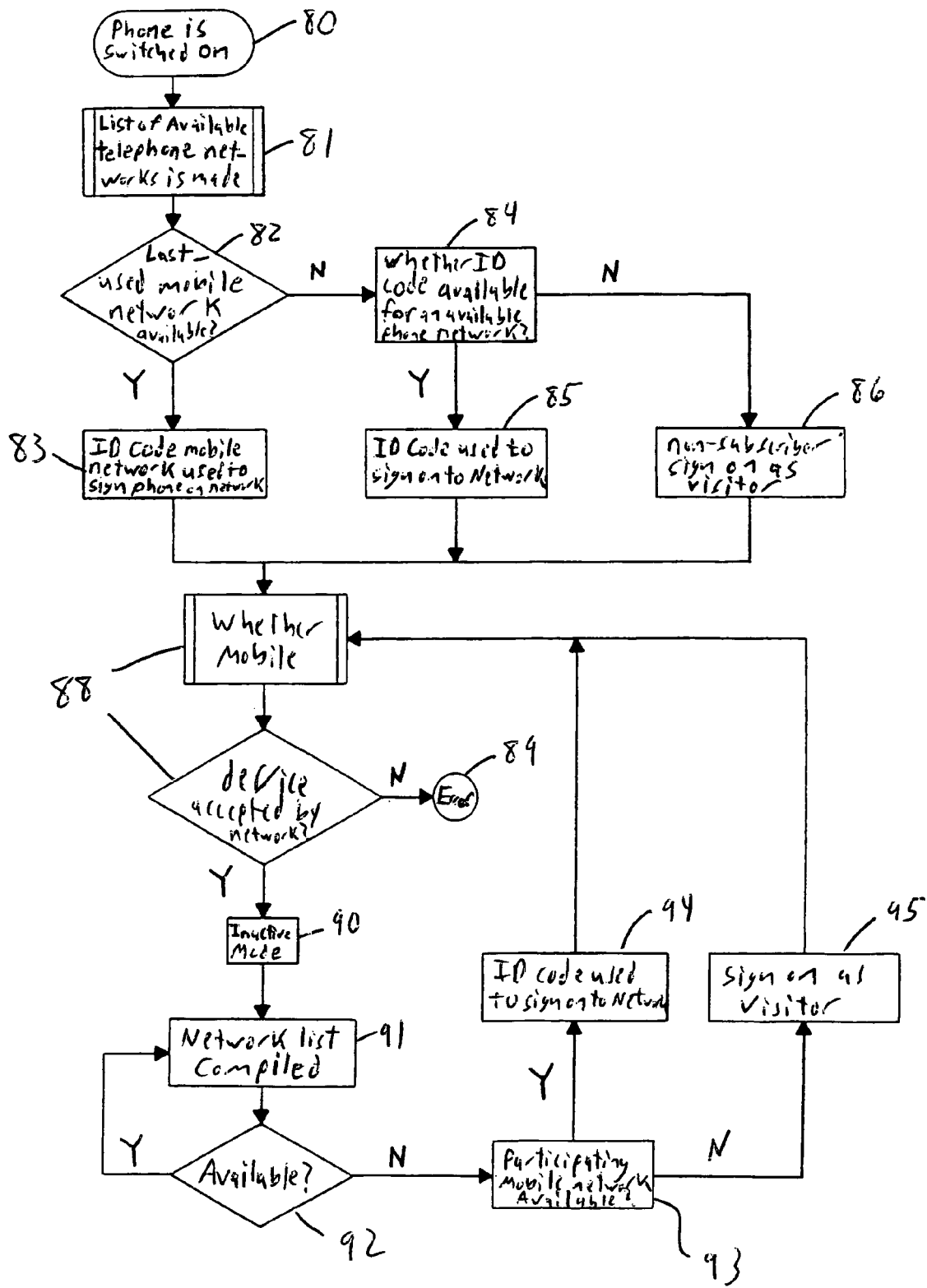
FIG. 5 is a flow diagram of a preferred embodiment according to the present invention.

For this purpose (FIG. 5) the telephone is switched on in 80, whereafter a list of available mobile telephone networks is made in 81. In 82 is then determined whether the last-used mobile network is available. If this is the case, the identification code for this mobile network is used to sign the telephone on to the network. If the last-used mobile telephone network is found in 82 to be unavailable, it is determined in 84 whether an identification code is available for an available telephone network, wherein an available telephone network can be a network which is associated with the coordinating network as a mobile (connecting) network for telephony or data. If in this manner a suitable mobile network is found in 84, the associated identification code is used to sign on to this mobile network in 85. If no identification code associated with an available network is found in 84, the option is provided in 86 for non-subscribers to sign on to an available mobile network as visiting user, without making use of the method according to the present invention.

While a mobile telephone is switched on it is possible that it moves outside the range of the mobile network being used at that moment. If the telephone is connected to a network and moves out of range, another mobile telephone network is selected or re-selected in 87. An assessment is then made in 88 as to whether the mobile device is accepted by the network. If this is not the case, an error is displayed in 89. If the apparatus is accepted, it goes into an inactive mode in 90. In 91 a network list is then compiled in similar manner as in 81. In 92 the last-used mobile network is then checked for availability in similar manner as in 82. If it is available, it is selected again in 91. If in 92 the last-used mobile network is found to be unavailable, a check is made in 93, in similar manner as in 84, as to whether a participating mobile network is available. If such a mobile network is available, it is used by using the appropriate identification code of this network to sign on to this network. If no suitable network is found in 93, the subscriber is offered the option of signing on to a physically available prior art network as visiting user.

A second way of signing a mobile device on to a network using modified SIM cards in accordance with a method according to the present invention is by providing the SIM card with software which generates an identification code on the basis of data of the subscriber and the mobile network for signing onto. According to the flow diagram of FIG. 5, if a mobile network is selected, a code associated with that network and stored on the SIM card is in this case not selected, but a code is generated by the software on the basis of data relating to the network and data relating to the subscriber.

A third option is to provide the subscriber with a separate, physical SIM card for each network to which he can sign on, which card he/she can select manually if he/she is within range of the associated network.

The present invention is not limited to the described preferred embodiments; the rights sought are defined by the following claims.

The invention claimed is:

1. A method for transfer of (voice) data of users of a hierarchically superior service network for the purpose of communication over mobile networks, comprising the steps of:

storing data about mobile devices of users and/or data about users in one or more first data files of the hierarchically superior service network;

transfer coordinated by the hierarchically superior service network and/or by the hierarchically superior service network itself of (voice) data which users wish to have transferred and/or data used to route and/or store the data; and providing the capability for several mobile networks to provide mobile network facilities for connecting the mobile devices of the users to the first hierarchically superior service network, wherein each of the mobile devices, when connected to a mobile network, is connected to the mobile network as a local device for the mobile network, the method further comprising one or more steps for:

using one or more identification modules for signing a mobile device on to a mobile network using identification means present on an identification module, and a separate identification module is arranged in the mobile device per type of mobile network, wherein the user of the device selects which module can be used as local identification module for an available mobile network, wherein a user of the hierarchically superior service network gains access to the hierarchically superior service network via one of the mobile networks regardless of the coverage area in which the user is situated.

2. The method according to claim 1, in which the mobile network for providing mobile network facilities comprises a telephony network.

3. The method according to claim 2, in which the telephony network comprises a GSM or UMTS network.

4. The method according to claim 1, in which the mobile network for providing mobile network facilities comprises a wireless computer network.

5. The method according to claim 4, in which the computer network comprises a wireless LAN network.

6. The method according to claim 1, in which identification of mobile devices is carried out by means of at least one of IMSI, phone number, network card identification number, and IP address.

7. The method as claimed in claim 1, further comprising the step of:

using one or more data files of local users (HIR) of each of several mobile networks for signing a mobile device of a user on to each of these mobile networks, wherein identification data relating to mobile devices of network users and/or relating to network users is stored in data files of local users of each of the mobile networks of which the user can make use.

8. The method as claimed in claim 1, further comprising the step of:

using one or more first databanks to sign the mobile device of the user on to the service network.

9. The method as claimed in claim 1, wherein the identification means for each mobile network are provided with one or more identification codes and an algorithm for selecting the correct one thereof, which is recognized by a mobile network as a local identification code.

10. The method as claimed in claim 9, further comprising the step of:
using one or more first databanks for signing the mobile device of the user on to the service network.

11. The method as claimed in claim 1, wherein the identification means comprise an algorithm for generating an identification code which is recognized by a mobile network as a local identification code.

12. The method as claimed in claim 11, further comprising the step of:
using one or more first databanks for signing the mobile device of the user on to the service network.

13. The method as claimed in claim 1, further comprising the step of:
using one or more first databanks for signing the mobile device of the user on to the service network.

14. The method as claimed in claim 1, wherein the data file of local users of the service network is placed distributed per mobile switching centre (MSC) in the mobile networks so as to reduce network traffic in respect of this data.

15. The method as claimed in claim 14, wherein the distributed data files are incorporated in a mobile network as Signalling Points (SPs) with their own address in accordance with a communication protocol.

16. The method as claimed in claim 1, wherein mobile switching centres (MSCs) are connected to the service network by means of one or more networks.

17. A system for transferring (voice) data of users of a hierarchically superior service network, comprising:
a hierarchically superior service network comprising one or more databanks for storing data about mobile devices of users and/or about users, and means for coordinating and/or transferring (voice) data which users wish to have transferred and/or data used to route and/or store the data, and
several mobile networks for connecting each mobile device of the subscribers to the hierarchically superior service network, wherein each of the mobile devices, when connected to each of the mobile networks, is connected to the mobile network as a local device for the mobile network,
using one or more identification modules for signing a mobile device on to a mobile network using identification means present on an identification module, and a separate identification module is provided per type of mobile network for arranging thereof in the mobile device, wherein the user of the device selects a module for local identification for an available mobile network, wherein a user of the hierarchically superior service network gains access to the hierarchically superior service network via one of the mobile networks regardless of the coverage area in which the user is situated.

18. The system as claimed in claim 17, further comprising:
one or more data files of local users of a mobile network for signing a mobile device of a user on to the mobile network, wherein the identification data relating to mobile devices of network users and/or relating to network users is stored in data files of local users of each mobile network of which the user can make use.

19. The system as claimed in claim 17, further comprising:
one or more first databanks for signing the mobile device of the user on to the service network.

20. The system as claimed in claim 17, wherein the identification means for each mobile network are provided with one or more identification codes and an algorithm for selecting the correct one thereof, which is recognized by a mobile network as a local identification code.

21. The system as claimed in claim 20, further comprising:
one or more first databanks for signing the mobile device of the user on to the service network.

22. The system as claimed in claim 17, wherein the identification means comprise an algorithm for generating an identification code which is recognized by a mobile network as a local identification code.

23. The system as claimed in claim 22, further comprising:
one or more first databanks for signing the mobile device of the user on to the service network.

24. The system as claimed in claim 17, further comprising:
one or more first databanks for signing the mobile device of the user on to the service network.

25. The system as claimed in claim 17, wherein the data file of local users of the service network is placed distributed per mobile switching centre (MSC) in the mobile networks so as to reduce network traffic in respect of this data.

26. The system as claimed in claim 25, wherein the distributed data files are incorporated in a mobile network as Signalling Points (SPs) with their own address in accordance with a communication protocol.

27. The system as claimed in claim 17, wherein mobile switching centres (MSCs) are connected to the service network by means of one or more networks.

\* \* \* \* \*